United States Patent [19]

Suda et al.

[11] Patent Number: 5,041,910
[45] Date of Patent: Aug. 20, 1991

[54] APPARATUS HAVING IMPROVED SWITCHING FUNCTIONS FOR PROCESSING VIDEO SIGNALS

[75] Inventors: Tomomichi Suda; Morio Usami, both of Tokyo; Koji Kobayashi; Kenji Watanabe, both of Aichi, all of Japan

[73] Assignee: Sony Corporation, Tokyo, Japan

[21] Appl. No.: 576,187

[22] Filed: Aug. 27, 1990

Related U.S. Application Data

[63] Continuation of Ser. No. 214,530, Jul. 1, 1988, abandoned.

[30] Foreign Application Priority Data

Jul. 10, 1987 [JP] Japan ................................. 62-173336

[51] Int. Cl.$^5$ ........................................... H04N 5/262
[52] U.S. Cl. ................................................... 358/181
[58] Field of Search .......................... 358/181, 183, 22

[56] References Cited

U.S. PATENT DOCUMENTS 4,525,738  6/1985  Imazeki ................................ 358/181
4,782,391 11/1988  McNeely .............................. 358/183
4,789,905 12/1988  Ezaki .................................... 358/181

Primary Examiner—Tommy P. Chin
Attorney, Agent, or Firm—Ronald P. Kananen

[57] ABSTRACT

An apparatus for processing video signals which is adapted to a function for superimposing a video signal different from a video signal which is separated into a luminance signal and chromatic signal on the video signal is disclosed. The video signal processing circuit includes a first input terminal for inputting the video signal which is separated into the luminance signal and chromatic signal, a second input terminal to which the video signal is inputted as a composite signal, and a third input terminal to which an image signal different from the video signal is inputted, and a control circuit for switching the input signal from the third input terminal so as to superimpose the input signal from the third input terminal on the input signal from the second input terminal.

18 Claims, 2 Drawing Sheets

| INPUT (1) | INPUT (2) | D. PART 2a | D. PART 3a | SWITCH 2 | SWITCH 3 |
|---|---|---|---|---|---|
| H | H | H | H | C | B |
| H | L | H | L | C | A |
| L | H | L | H | D | B |
| L | L | L | H | D | B |

| MODE | S INPUT | COMPOSITE VIDEO INPUT | TELEVISION SIGNAL INPUT | RGB MULTI-PIN INPUT |
|---|---|---|---|---|
| TV MODE | | | O | |
| COMPOSITE VIDEO MODE | | O | | |
| S INPUT MODE | O | | | |
| RGB MODE | | O  OR  | O | → O |

APPARATUS HAVING IMPROVED SWITCHING FUNCTIONS FOR PROCESSING VIDEO SIGNALS

BACKGROUND OF THE INVENTION (1) Field of the Invention

The present invention relates to an apparatus for processing a video signal. The video signal processing apparatus can be used in a color television receiver capable of displaying images on the basis of video signals separated into a luminance signal and a chromatic signal and which can be adapted to a function of superimposing computer images on the images of the video signals.

(2) Background of the Art

Color television receivers capable of displaying images of video signals derived from an external computer superimposed on those derived from a VTR (Video Tape Recorder) have been proposed.

For the transmission and reception of the computer images, an RGB (Red, Green, and Blue) signal is normally used.

As a representative interface, RGB multi-pin connectors, 21 pins, are extensively adopted in character broadcastings, videotex, and personal computers.

The RGB multi-pin connector installed on the television receiver includes a first terminal through which a video signal derived from the VTR (including a synchronization signal) is outputted to the computer in order to synchronize between those video signals when the computer images are superimposed on the VTR images (RGB multi-pin connector video output terminal), a second terminal through which the synthesized video signal to be synthesized so as to be superimposed on the VTR images is inputted to the television receiver (RGB multi-pin connector video input terminal), and a third terminal (RGB input terminal) through which the computer images are inputted to the television receiver. It is noted that the video signals inputted and outputted through the RGB multi-pin connector are composite picture signals.

A previously proposed switching circuit for the video signal includes a first switch for selecting either of a television signal or a composite video signal from the video equipment such a the VTR and a second switch for selecting either of the selected input signal via the first switch or the video signal inputted via the computer to be superimposed on the television signal or VTR video signal.

The selected input of the first switch is supplied to the computer as an output video signal (RGB multi-pin connector video output signal). After the supplied input is used for the synchronization processing of the computer image with the VTR or television signal, the synchronized computer video signal is inputted to the second switch as an input video signal (RGB multi-pin connector video input signal) to be superimposed on the VTR or television signal. The first switch and second switch are changed over in response to a command from an operation switch installed on a front or rear surface of the television receiver.

That is to say, a portion of a movable contact of the first switch is placed at an input contact receiving the television signal when no video switching signal is present. When the video switching signal is present, the position of the movable contact of the first switch is placed at the other input contact receiving the composite video signal. On the other hand, a movable contact position of the second switch is placed at the first switch contact side when no RGB switching signal is present. When the RGB switching signal is present, the movable contact position of the second switch is placed at the RGB multi-pin connector video input contact side.

The previously proposed television receiver carries out the image display with the composite video signal separated into its luminance signal and its chromatic signal by means of a comb filter. Recently, however, a new television receiver has been proposed having a so called S terminal input through which a video signal derived from the VTR is already separated into the luminance signal and the chromatic signal to make a further improvement of a picture quality of the television receiver.

However, the following problems arise in the switching circuit of the video signal for the latter proposed television receiver.

(1) Since it is necessary to include the synchronization signal in the video output signal outputted via the RGB multi-pin connector video output terminal to superimpose the video signal derived from an external computer on the S terminal input 4, the RGB multi-pin connector video signal is only the luminance signal derived from the S input terminal. Therefore, the superimposed image of the VTR or television is merely a monochrome image.

(2) To solve the problem of (1), a circuit for synthesizing the luminance signal and the chromatic signal which are separated in the television receiver to produce a video composite output signal for the RGB multi-pin connector used to superimposed onto the images derived from the VTR and so on. However, such a circuit as described above is complex in circuit construction and is therefore expensive.

(3) To solve the above-described problem of (1), the composite video signal which has normally been prepared in the VTR together with the separated video signal for the S terminal is utilized to cause an image superimposition. At this time, means for rewiring the connections and switching the connections have been considered. However, the operation for the rewiring and switching means becomes troublesome.

SUMMARY OF THE INVENTION

It is, therefore, an object of the present invention to provide an apparatus for processing video signals which can be adapted to a function of, e.g., a television receiver for superposing images on different images and can provide a good operability in a simple circuit construction when superimposing on the images of the video signals separated into the luminance signal and chromatic signal on different images.

The above-described object can the be achieved by providing an apparatus for processing video signals comprising; (a) a first terminal for inputting a first video signal which is separated into a luminance signal and a chromatic signal., (b) a second terminal for inputting the first video signal as a composite signal; (c) a third terminal for inputting a second video signal; (d) a first switching means for selecting either a signal from the first terminal or a signal from the second terminal, and (e) controlling means for controlling the first switching means so as to select the signal from the second terminal when a signal from the third terminal is combined with the first video signal.

DETAILED DESCRIPTION OF THE PREFERRED EMBODIMENT

Reference will hereinafter be made to the drawings in order to facilitate understanding of the present invention.

Figure 1:
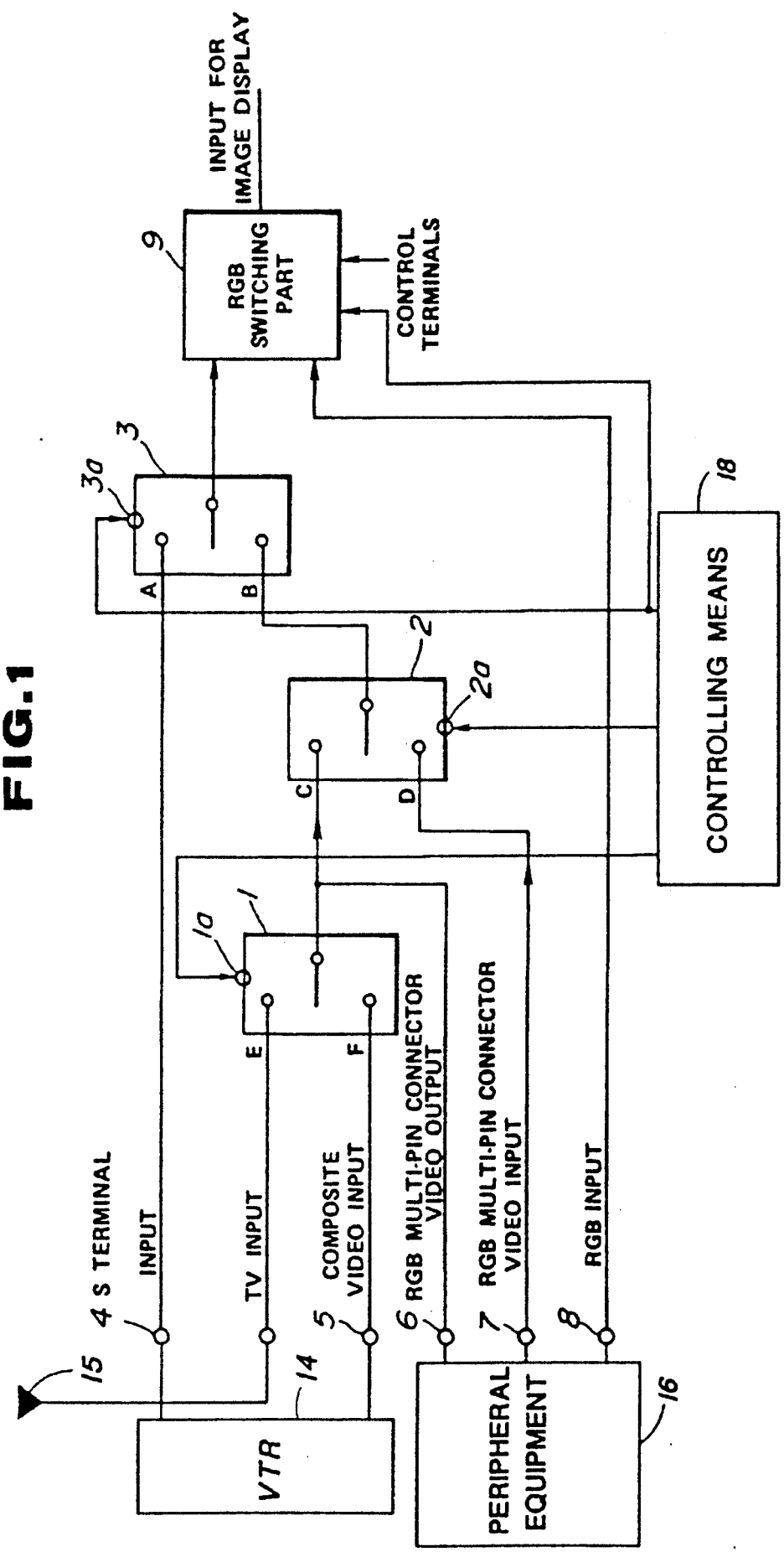
FIG. 1 is a circuit block diagram of a video signal processing apparatus in a preferred embodiment according to the present invention.

FIG. 1 shows a circuit block diagram of a video signal processing apparatus in a preferred embodiment according to the present invention.

In the preferred embodiment, the video signal processing apparatus is applied to a television receiver. For clarity of use of terminology in the specification and claims, it is pointed out that specification terminology using first, second and third in relationship to switches 1, 2 and 3 should not be confused with utilization of the terminology first, second and third when referring to the means clauses in the claims. The video signal processing apparatus shown in FIG. 1 includes (a) a first switch 1 for selectively switching either a television signal TV input E or a composite video signal video input F derived from a composite video input terminal 5, (b) a second switch 2 for selectively switching either the selected output C from the first switch 1 or a video input D derived from an RGB multi-pin connector terminal 7, and (c) a third switch 3 for selectively switching either the selected output B from the switch 2 or an S terminal input A derived from an input terminal 4. Each switch 1, 2, 3 is respectively provided with a driving port 1a, 2a, 3a. Each switch 1, 2, 3 is switched to either of the two inputs depending on whether a signal inputted to the corresponding driving port 1a, 2a, 3a is at a high level (H) or at a low level (L).

For example, when the driving port 1a of the first switch 1 receives a high level input signal (H), the first switch 1 selects one connection side E of the television signal TV. When the driving port 1a receives a low level input signal (L), the first switch 1 selects the other connection side F connected to the composite video signal input terminal 5. On the other hand, when the driving port 2a receives a high level input signal (H), the second switch 2 selects one connection side C connected to the selected output side of the first switch 1. When the driving port 2a receives a low level input signal (L), the second switch 2 selects the other connection side D connected to the video input terminal 7 of the RGB multi-pin connector. Furthermore, when the input signal of the driving port 3a is at a high level (H), the third switch 3 selects one connection side B connected to the selected output side of the second switch 2. When the driving port 3a receives a low level signal (L), the third switch 3 selects the other connection side A connected to the S terminal input from terminal 4 to provide an image display input for the television receiver. Each switch 1, 2, 3 is constituted by, e.g., an analog switch.

An external input/output terminal of the video signal processing apparatus for the television receiver in the preferred embodiment includes a separation input terminal 4 (a so called; S terminal) of the video signal separated into a luminance signal and a chromatic signal which is supplied from the VTR 14 a composite video signal input terminal 5 through which a composite signal of the video signal supplied from the VTR 14 is inputted, a video output terminal 6 on the RGB multi-pin connector through which the video signal ,is outputted to synchronize with the other video signal (on terminal 7) and a video input terminal 7 on the RGB multi-pin connector through which the video signal from the peripheral video equipment 16 to be superimposed is inputted. The input sides of the respective terminals 4, 5, 6, and 7 are connected to the respective switches 1, 2, 3 as shown in FIG. 1. The video output terminal 6 on the RGB multi-pin connector receives the selected output of the first switch 1 supplied to the second switch 2. The television signal TV is supplied to a terminal, i.e., the TV INPUT side as shown in FIG. 1 from an internal circuit of the television receiver, the television signal TV being a normal television signal supplied, e.g., from an antenna 15. The above-described S terminal 4 constitutes a first input terminal according to the present invention and the above-described composite video input terminal 5 constitutes a second input terminal.

Furthermore, the video signal processing apparatus in the preferred embodiment includes: an RGB input terminal 8 on the RGB multi-pin connector as a third input terminal and an RGB switching part 9. Upon receipt of the RGB input signal from the RGB input terminal 8 and the image displaying input signal passed through the third switch 3, the video signal processing apparatus carries out a series of switching processings in such a way that the RGB input signal from the RGB input terminal 8 is directly displayed (RGB mode, no superimposition),the image display input is directly displayed (TV mode, composite video mode, S input mode) and the RGB input is synthesized to the composite signal for the image display (RGB mode where, superimposed is present). These display mode switchings are carried out in response to commands derived from a logic circuit, acting as a switching controlling means 18. The switching commands derived from the logic circuit 18 are determined on the basis of instructions derived from operation input switches installed on a front or a rear surface of the television receiver or on a remotely operated switch, or alternatively derived from the computer 18 (as shown in FIG. 2).

Figures 2, 3, 4:
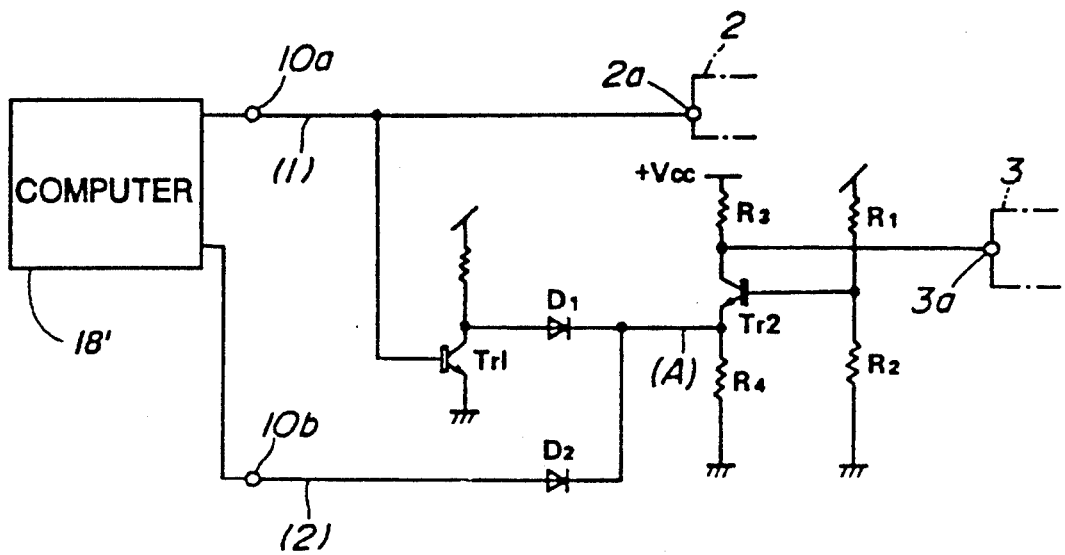
FIG. 2 is a logic circuit diagram for switching an essential part of the video signal processing apparatus shown in FIG. 1.
FIG. 3 is a logic table for the logic circuit shown in FIG. 2.
FIG. 4 is a output logic table for a switching circuit shown in FIG. 1.

FIG. 2 shows a circuit wiring diagram of the logic circuit 18 for switching the second and third switches 2 and 3.

Input terminals denoted by 10a, 10b are connected to logic outputs of , e.g., the computer 18 or the manually operated input switches referred to in the Background section above. A peripheral circuit including a transistor Tr1 constitutes an inverter receiving an input signal derived via the input terminal 10a. Two diodes $D_1$ and $D_2$, transistor Tr2, and resistors $R_1$, $R_2$, $R_3$, and $R_4$ constitute an OR circuit receiving the output signal of the inverter and input (2) derived from the input terminal 10b. A collector of the transistor Tr2 is connected to a bias supply $+Vcc$ via a resistor $R_3$, an emitter thereof being grounded via a resistor $R_4$ and being connected to cathodes of the diodes $D_1$ and $D_2$. An anode of the diode $D_1$ is connected to an inverted output of the inverter and the anode of the diode $D_2$ is connected to the input (2). A base of the transistor Tr2 receives the bias voltage through a division circuit constituted by resistors $R_1$ and $R_2$. The bias level, i.e., resistance values of the resistors $R_1$ and $R_2$ are set such that when a point (A) of the emitter of the transistor Tr2 is at a low level (L), the base potential of the transistor Tr2 is higher by a base-emitter voltage $V_{BE}$ and when the point (A) is at a high level (H), the base potential becomes lower by the base-emitter voltage $V_{BE}$. Resistance values of the resistors R3 and R4 are determined so that a level change of the collector output of the transistor Tr2 rises or lowers through the threshold voltage of the driving port 3a of the third switch 3 to change over the third switch 3. It is noted that the input signal (1) is directly separated to the driving port 2a of the second switch 2 and the OR circuit output signal (,i.e., collector output signal of the transistor $T_{r2}$) is supplied to the driving port 3a of the third switch 3.

FIG. 3 shows a logic table of the logic circuit described above.

Since the input signal denoted by (1) is supplied to the driving port 2a and the driving port 3a receives input (1)+input (2), the driving port 3a indicates the L level only when input signal (1) and input signal (2) = L. The driving port 3a goes to the high level (H) in the other cases. Consequently, each switch 2 and 3 selects the input contact side A, B, C and D shown in the table of FIG. 3.

The high level of the input signal (1) is defined as an S input mode, the low level of the input (1) is defined as a TV mode or a Video mode, the high level of the input (2) is defined as an RGB mode, and the low level of the input (2) is defined as non-RGB mode. The third switch 3 is always switched to the TV mode or the Video mode irrespective of the S input mode (i.e., the input level of the inverter is high) when the RGB mode is selected. In the S input mode and in the RGB mode, the superimposition of the image on the same image as in the S input mode (non-RGB mode) through the composite signal is possible if the driving port 1a of the first switch 1 automatically receives (or manually through the operation switch ) the low level (L) to select the video input side.

FIG. 4 shows an output logic table for the input for displaying the images to be outputted from the switch circuit shown in FIG. 1.

The first switch 1 determines whether the TV mode (television TV signal selection) or Video mode (composite video signal selection). The switching to the S input mode (S input selection) has a higher priority than the switching of the first switch 1 to the TV mode or Video mode. Furthermore, in the RGB mode which has a higher priority than the S input mode, either the television TV signal or composite video signal is selected according to a switched state of the first switch as the video input signal derived from the RGB multi-pin connector so that the superposition of the image is enabled.

As described above, when the RGB mode is entered during the S input mode, the composite signal of the video signal derived from the S input terminal 4 is automatically selectable as the RGB multi-pin connector input signal. The operability during the RGB mode switching is improved.

It is noted that although the switching logic circuits are not limited to those in the preferred embodiment, various types of the circuits can be used. In addition, the number of terminals used for the S input and composite video signal input may be plural or alternatively may be one if they are suitably switched and selected. The video signal processing apparatus according to the present invention is not limited to the apparatus incorporated into the television receiver but is applicable to a no-television signal receiver such as a monitor receiver and furthermore is applicable as an independent apparatus.

If no television signal is present, the first switch 1 is not required. The composite video input signal may be inputted to the second switch 2 and may be outputted as the video output signal on the RGB multi-pin connector. The switching circuit, logic circuit shown in FIG. 2, and RGB switching part 9 shown in FIG. 1 are examples of controlling means according to the present invention. The logic circuit and RGB switching part may be installed externally.

As described hereinabove, the video signal processing apparatus according to the present invention, when a different image is superimposed on an image of the video signal which is separated into the luminance signal and the chromatic signal, can cope with the superposition function of the image with good operability in a simple circuit construction.

What is claimed is:

1. An apparatus for processing video signals comprising:
   (a) a first input terminal (4) for inputting a first video signal which is separated into a luminance signal and a chromatic signal;
   (b) a second input terminal (5) for inputting a composite video signal corresponding to said first video signal, said composite video signal including a synchronization signal;
   (c) a third input terminal (8) for inputting a second video signal;
   (d) first switching means (3) for selecting between two inputs thereto, the first input thereto being said first video signal supplied to said first input terminal (4) and the second input thereto being said composite signal supplied to said second input terminal (5); and
   (e) controlling means (18) for controlling said first switching means (3) for selecting said composite signal from said second input terminal (5) when an image of said second video signal from said third terminal (8) is to be superposed onto an image of said first video signal.

2. An apparatus as set forth in claim 1, comprising:
   a fourth input terminal (TV) for receiving a normal television signal; and
   second switching means (1) receiving an inputs from said fourth input terminal (TV) said normal television signal and said composite signal from said second input terminal (5), for selecting either said normal television signal or said composite signal and for supplying the selected signal as an output signal of said second switching means (1).

3. An apparatus as set forth in claim 2, comprising a first output terminal (6) and a peripheral equipment for supplying said second video signal, wherein said output of said second switching means (1) is outputted from said first output terminal (6) to said peripheral equipment for synchronizing said second video signal with said output of said second switching means (1).

4. An apparatus as set forth in claim 3, comprising a fifth input terminal (7), wherein said synchronization signal output on said first output terminal (6) for said synchronization of said second video signal is again inputted to said fifth input terminal (7) and the image thereof is utilized for said superposing by said image of said second video signal.

5. An apparatus as set forth in claim 4, which further comprises third switching means (2) for selecting between said signal inputted through said fifth input terminal (7) and said signal output from second switching means (1), and for supplying the selected signal by said third switching means as said first input to said first switching means (3).

6. An apparatus as set forth in claim 5, wherein said first switching means (3) selects either one of the input signal from said first input terminal or said output signal from said third switching means (2).

7. An apparatus as set forth in claim 6, which further comprises a synthesization circuit (9) to which the output signal from said first switching means 3 and said image signal on said third input terminal (8) are inputted.

8. An apparatus as set forth in claim 7, wherein the synthesization circuit carries out each said superpositioning.

9. An apparatus as set forth in claim 3, wherein said third input terminal (8), first terminal (4), and fifth input terminal (7) are installed on the RGB multi-pin connector.

10. An apparatus as set forth in claim 8, wherein said synthesization circuit (9) is provided with a control signal input terminal (3), wherein a control signal inputted from said controlling means (18) to said control signal input terminal (3) is utilized to select either of the signals inputted to said synthesization circuit (9).

11. An apparatus as set forth in claim 10, wherein said control signal inputted to synthesization circuit (18) has a first mode for outputting only the image of said output signal of said first switching means, a second mode for outputting only the image of said second video signal, and a third mode for outputting the image of said second video signal superimposed on the image of said output signal of said third switching means.

12. An apparatus as set forth in claim 6, wherein each said switching means in controlled in such a way that when said third mode is selected, the signal inputted through said fifth input terminal (7) is the output signal from said first switching means.

13. An apparatus as set forth in claim 1, wherein said second video signal input on said third input terminal is a signal corresponding to an image derived from a computer.

14. An apparatus as set forth in claim 1, wherein said second video signal is an RGB signal.

15. An apparatus as set forth in claim 1, wherein said first and second input terminals are connected to a VTR.

16. A television receiver including said apparatus as set forth in claim 1.

17. A VTR including said apparatus as set forth in claim 1.

18. An apparatus for processing video signals for a television receiver, comprising:
   (a) a first terminal (4) passing a first video signal derived from a magnetic tape recording and reproducing apparatus, said first video signal being separated into a luminance signal and a chromatic signal;
   (b) a second terminal (5) passing a composite signal corresponding to the first video signal;
   (c) a third terminal (8) passing a second video signal derived from a computer;
   (d) a first means (3) for selecting either of said first video signal from said first terminal or said composite signal from said second terminal when said second video signal from said third terminal is to be superposed on said first video signal.

* * * * *